Figure 1:
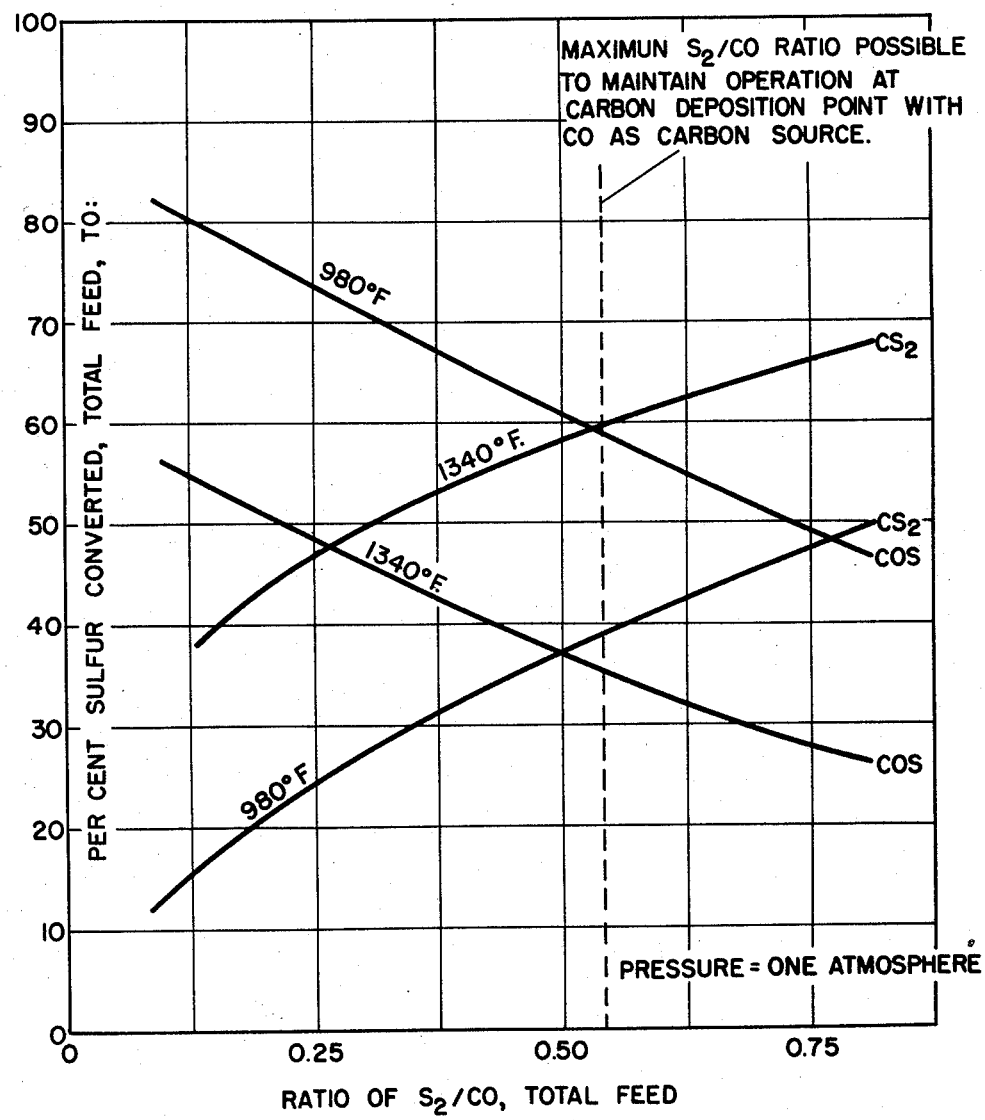

INVENTORS
WILLIS A. ADCOCK
WILLIAM C. LAKE
BY Arthur McElroy
ATTORNEY

2,935,380
PROCESS FOR PREPARATION OF CARBON DISULFIDE AND CARBONYL SULFIDE

Willis A. Adcock and William C. Lake, Tulsa, Okla., assignors to Pan American Petroleum Corporation, a corporation of Delaware Application May 1, 1953, Serial No. 352,418

5 Claims. (Cl. 23—203)

Our invention relates to a method for the preparation of carbon disulfide and carbonyl sulfide. More particularly, it is concerned with novel conditions employed in the manufacture of these materials from elemental sulfur and carbon monoxide or from compounds which, under the conditions employed by the process of our invention, yield free sulfur and carbon monoxide.

It is an object of our invention to provide an improved method for the preparation of carbon disulfide from relatively-cheap, readily-available starting materials. It is likewise an object of our invention to produce, simultaneously with said carbon disulfide, substantial quantities of carbonyl sulfide. It is another object of our invention to provide a process for the preparation of carbon disulfide and carbonyl sulfide which may be readily integrated into the operation of a plant recovering sulfur from sour natural gas. It is a still further object of our invention to provide a method for the preparation of carbon disulfide where the preheat required for the reactants in the exothermic reaction $$2CO + S_2 \rightarrow \tfrac{1}{2}CO_2 + COS + \tfrac{1}{2}CS_2$$

may be supplied almost entirely from the reaction itself or from the sensible heat in the product gas.

In carrying out the process of our invention, sulfur vapors and carbon monoxide in a molar ratio of from about 0.10 to about 0.5, preferably in the neighborhood of about 0.5, are first preheated to a temperature of about 800° to 850° F. Thereafter the resulting preheated mixture of carbon monoxide and sulfur vapors is introduced into a suitable reaction zone maintained at a temperature ranging from about 950° to about 1700° F., preferably at about 950° to 1000° F. A catalyst may or may not be employed in effecting reaction between carbon monoxide and sulfur vapors; however, in the majority of instances, we generally prefer to use one. The reaction, which is preferably carried out at atmospheric pressure, results in the formation of carbon diodixe and carbonyl sulfide as well as carbon disulfide, and these hot reaction products—together with unconverted sulfur and carbon monoxide—are withdrawn from the reaction zone and sent to a suitable heat exchanger where they are brought into indirect heat exchange with a cooler, gaseous stream of sulfur vapors and/or carbon monoxide. In the event sulfur vapors are not introduced into the system at this point, they may be added to the hot carbon monoxide prior to entering the reaction zone in a manner hereinafter described in more detail. The resulting cooled product gases are then subjected to further cooling or condensation where the unconverted sulfur present therein is separated from the other components of the mixture and returned to a suitable preheater from which sulfur vapors are supplied for use in the reaction. The combination of increased pressure and additional cooling of the gaseous effluent from the sulfur condensation step results in the removal of product carbon disulfide, leaving a gaseous mixture containing carbon monoxide, carbon dioxide and carbonyl sulfide. The details involved in processing this stream will be described below.

The atomic ratio of sulfur to oxygen employed in carrying out our invention may vary from about 0.18:1 to about 1:1. Generally we prefer to use these reactants in a ratio of the order of about 1:1. The yield of carbon disulfide varies directly with the sulfur-oxygen ratio and with temperature. However, of these two conditions, the sulfur-oxygen ratio appears to have a more pronounced effect on carbon disulfide production. Carbonyl sulfide production, on the other hand, varies inversely with temperature, while the sulfur-oxygen ratio has no effect above a sulfur-oxygen ratio of 1.0. We have found, however, that for economic and other reasons it is generally desirable to operate under conditions which are generally most favorable for carbon disulfide production.

In carrying out the process of our invention, the overall reaction may be represented by the following equation:

$$2CO + S_2 \rightarrow \tfrac{1}{2}CO_2 + COS + \tfrac{1}{2}CS_2$$

We have found, however, that the molar ratios of carbon monoxide and sulfur indicated by the above equation are satisfactory only if the temperature employed is in the region of 950° to 1000° F. Thus, at about 1340° F. carbon monoxide is preferably employed in approximately 100 percent excess and, at temperatures in the neighborhood of about 1700° F., carbon monoxide is preferably used in approximately 500 percent excess over the quantity theoretically required by the above equation.

The relative proportions of carbonyl sulfide and carbon disulfide present in the product gases can, within limits, be controlled fairly well. Thus, as pointed out above, at higher temperatures the amount of carbon disulfide produced increases, while lower temperatures favor an increase in carbonyl sulfide production with a corresponding decrease in the carbon disulfide formed. Increased production of carbon disulfide is favored at temperatures ranging upwardly from about 950° to 1000° F. Thus the total feed conversion to carbon disulfide based on sulfur increases from 37 percent at about 980° F., to 48 percent at 1340° F. and to 55 percent at about 1700° F. With increasing temperature, the quantity of sulfur converted to carbonyl sulfide decreases from about 61 percent at about 980° F., to about 48 percent at about 1340° F. and to 39 percent at about 1700° F.

Within the sulfur-oxygen ratios defined above, the carbon-oxygen atomic ratio should preferably be maintained at about 1:1, the ratio prevailing when carbon monoxide is employed in the feed as the carbon source. By controlling the carbon-oxygen ratio so that it does not vary appreciably from a value of about 1:1 and by maintaining the above-recited conditions of temperature and of sulfur-oxygen ratios, the concentration of carbon in the system is such that carbon deposition—although just on the verge of occurring—can be avoided. It is under such conditions of impending carbon deposition at a given temperature that we have found the highest conversions to carbon disulfide to occur. We have further found the operation of the reaction under conditions of imminent carbon deposition to be extremely important, and any material variation from the carbon-oxygen ratio recommended above results in a drastic decrease in the formation of carbon disulfide and carbonyl sulfide. Thus, if the carbon-oxygen ratio decreases to a level below which carbon deposition is no longer impending, carbon disulfide yields drop off sharply. On the other hand, if the carbon-oxygen ratio is increased to a point where carbon deposition occurs to an appreciable extent, the activity of the catalyst is reduced to a point where further operation is no longer economical.

The effects of the above-mentioned conditions of temperature and sulfur-oxygen atomic ratio on sulfur conversion are further illustrated by the curves of Figure 1. The curve appearing in Figure 2 demonstrates the ratio of sulfur to carbon monoxide in the total feed required for operation at the carbon deposition point as a function of temperature. Thus, Figure 1 shows that at a given sulfur-oxygen atomic ratio (twice the $S_2$—CO ratio) in the total feed, the percent sulfur converted to carbon disulfide increases with temperature, while the percent conversion of sulfur to carbonyl sulfide decreases. For carbon disulfide production, the conversion increases with an increase in both temperature and sulfur-oxygen atomic ratio. However, with carbon monoxide as the carbon source, the maximum sulfur-oxygen atomic ratio which can be employed and still operate at the point of imminent carbon deposition is shown to be 1.08 or .54 for the $S_2$—CO ratio.

Figure 2:
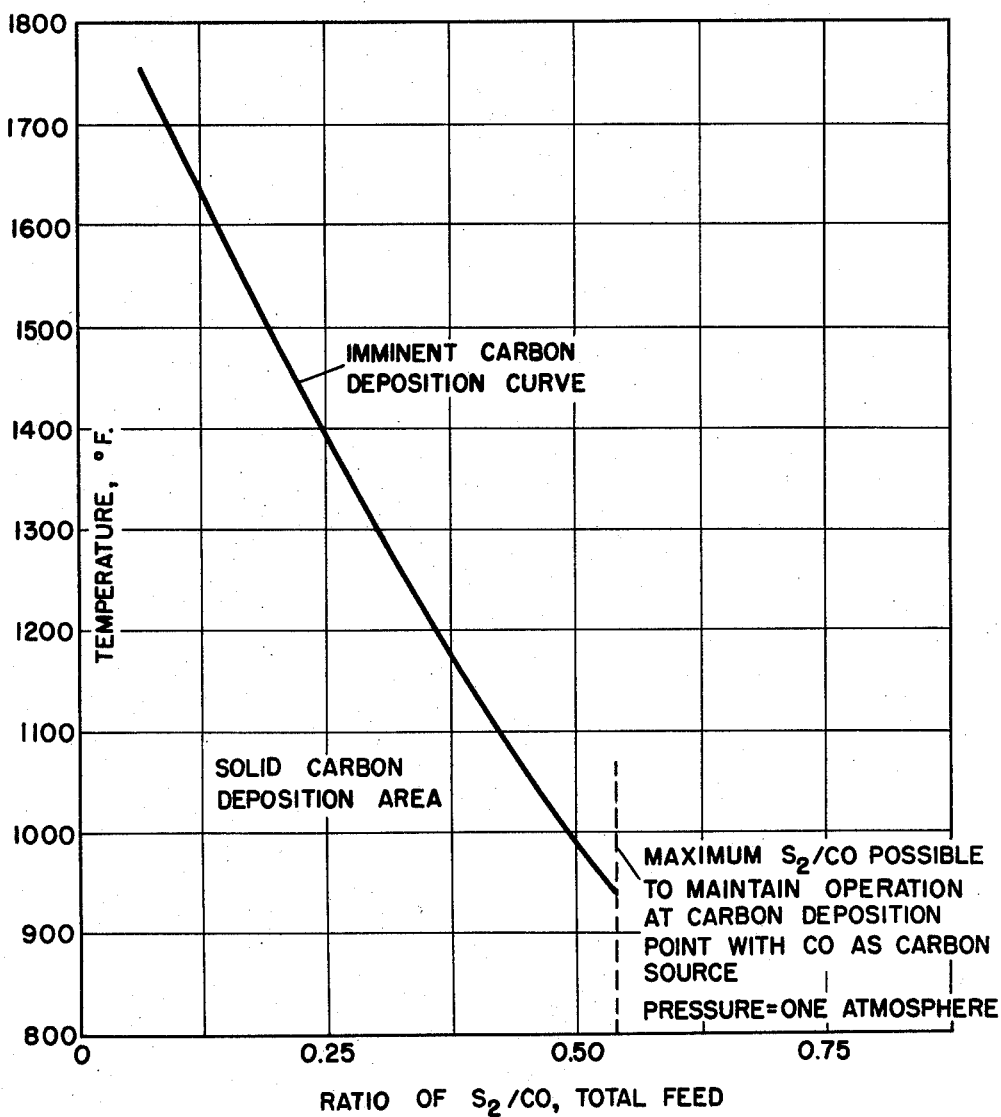

In Figure 2 it is shown that at low temperatures the sulfur-oxygen atomic ratio employed may be relatively high, i.e., 1.08 (.54 on $S_2$—CO basis), and still operate at the carbon deposition point, whereas with higher temperature the permissible sulfur-oxygen atomic ratio which may be used decreases. While both sulfur-oxygen atomic ratio and temperature have an important effect on carbon disulfide production, we have found that of the two conditions temperature appears to be the more important.

While it may generally be desirable to carry out the process of our invention in the presence of a catalyst, we do not consider it essential to do so in order to obtain carbon disulfide and carbonyl sulfide from sulfur and carbon monoxide in accordance with the novel conditions of operation set forth herein.

Space velocities used in the process of our invention may be varied within relatively wide limits with comparatively little change in the conversion secured. Maximum space velocities depend principally on the desired quantity of the reactants converted per pass. At a given temperature conversions decrease with increasing space velocities. However, conversions may be held substantially constant at increasing space velocities if the temperature is simultaneously increased. Under the conditions of our process, space velocities of from about 600 to about 3000 s.c.f.h. reactants per cubic foot of catalyst will generally be found satisfactory. When operating in the absence of a catalyst, residence times of the reactants in the reaction zone may vary from about 0.5 to about 1 second.

Inasmuch as pressure tends to reduce rather than increase the conversion to carbon disulfide, we prefer to carry out our process at substantially atmospheric pressure. Relatively slight increases in conversion are observed by using subatmospheric pressure, but from the standpoint of overall economy their use is not believed justified.

One of the outstanding features of our invention resides in the fact that it may be operated in conjunction with a plant recovering sulfur from sour natural gas. In recent years sulfur recovery plants of this type have become rather common and are an outgrowth of certain conservation requirements which have been laid down for the purpose of preventing the waste of large volumes of gaseous hydrocarbons. Thus, while the carbon monoxide used in the process of our invention may of course be prepared in accordance with a number of well-known methods, it will be found particularly convenient and economical to form the carbon monoxide by reforming the natural gas available in the field with steam in a known manner. Carbon monoxide thus produced may then be used with sulfur produced at the plant site to make carbonyl sulfide and carbon disulfide in accordance with our invention.

The following table indicates results which may be obtained by operating in the absence of a catalyst and within the ranges of reactants and temperatures covered by our invention using carbon monoxide as the carbon source. The figures appearing under each of the runs listed below show the concentration of corresponding components present in the tail gas from the reactor.

| Components of Reactor Tail Gas | Run 1*, 980° F. $S_2$/CO Molar Ratio=0.5; S/O Ratio=1.0 | Run 2*, 1,340° F. $S_2$/CO Molar Ratio=0.275; S/O Ratio=0.550 | Run 3*, 1,700° F. $S_2$/CO Molar Ratio=0.090; S/O Ratio=0.180 |
|---|---|---|---|
| | Mol Percent | Mol Percent | Mol Percent |
| COS | 59.8 | 25.0 | 6.7 |
| $CS_2$ | 18.2 | 12.5 | 4.7 |
| $S_2$ | 1.1 | 1.1 | 0.6 |
| CO | 4.1 | 52.4 | 86.0 |
| $CO_2$ | 16.8 | 9.0 | 2.0 |

*Atmospheric pressure.

Figure 3:
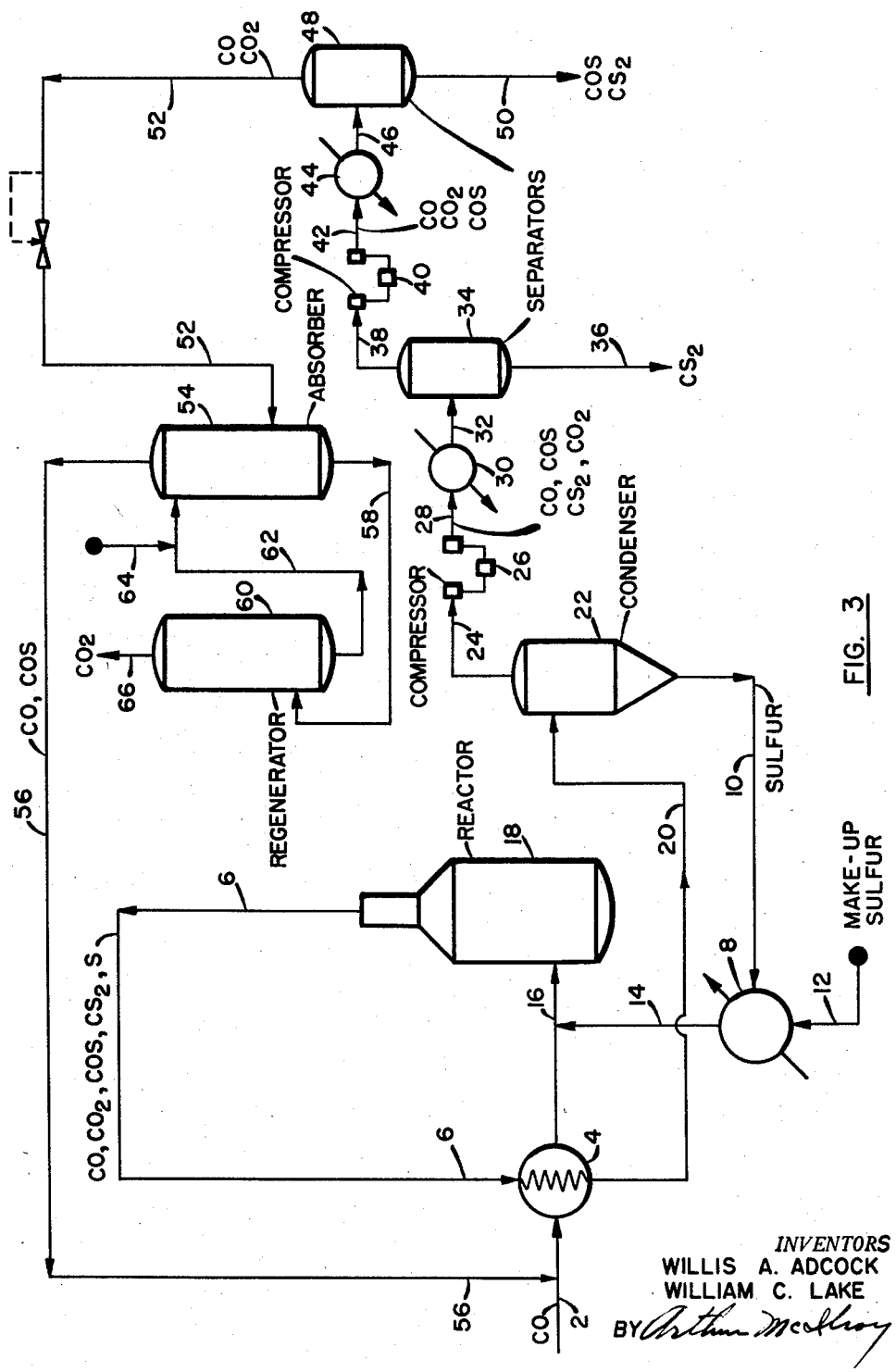

It will be seen from the information appearing in the above table that operation at higher temperatures necessitates rather high recycle requirements and, hence, unless justified by special circumstances, the use of such higher temperatures is to be avoided. On the other hand, the use of lower temperatures is generally most advantageous because of low recycle requirements. In fact, under certain temperature conditions, it is possible to operate in a relatively efficient manner without employing any recycle whatever. This feature will be discussed in further detail in connection with the description of the accompanying flow diagram (Figure 3). In the diagram referred to, carbon monoxide at atmospheric temperature in line 2 is added to heat exchanger 4, where the temperature of the carbon monoxide is increased to about 500° F. by indirect heat exchange with hot gaseous reaction products in line 6. Unconverted sulfur plus make-up sulfur are added to preheater 8 through lines 10 and 12, respectively, vaporized and the resulting vapors—which are at a temperature of from 1000° to 1200° F.—are sent through line 14 and combined with preheated carbon monoxide in line 16. The temperature of the resulting mixture is generally in the neighborhood of from 800° to about 850° F. Introduction of sulfur vapors is controlled in a manner such that the molar ratio of sulfur to carbon monoxide is about 0.5:1. Conversion of carbon monoxide and sulfur into carbon disulfide and carbonyl sulfide occurs in reactor 18, which may or may not contain a bed or a series of beds of suitable catalyst. The resulting gaseous products of the reaction are taken overhead from the reactor through line 6 and cooled by introduction thereof into heat exchanger 4, where said products pass in indirect heat exchange with the cooler carbon monoxide fed through line 2. The cooled gaseous reaction products are next sent through line 20 to condenser 22, where they are further cooled to a temperature of about 350° F. to separate liquid sulfur therefrom via line 10. The uncondensed gases, consisting essentially of carbon disulfide, carbon dioxide, carbonyl sulfide and carbon monoxide, are taken off through line 24 and transferred to compressor 26 where they are subjected to a pressure of approximately 90 p.s.i.g. The resulting compressed gases are withdrawn through line 28 and the temperature thereof reduced to about 32° F. in cooler 30. The resulting gas-liquid phase is sent through line 32 to separator 34, where approximately 89 percent of all carbon disulfide present in the product gases is removed therefrom in the form of a liquid through line 36. The gases taken off overhead through line 38 have the following composition:

2.4% $CS_2$
71.8% COS
20.7% $CO_2$
5.1% CO

The uncondensed gases in line 38, consisting primarily of carbon monoxide, carbon dioxide and carbonyl sulfide, together with a small amount of carbon disulfide, are then introduced into compressor 40 operated at approximately 300 p.s.i.g. The resulting compressed gases are next transferred to cooler 44, where their temperature is again reduced to about 32° F. The gas-liquid phase mixture produced in cooler 44 is withdrawn through line 46 and transferred to separator 48, where approximately 88 percent of the carbonyl sulfide present in the product gases—together with an additional 8.7 percent of carbon disulfide—is removed therefrom through line 50. The composition of the gas withdrawn from separator 48 through line 52 is approximately as follows:

1.4% $CS_2$
24.6% COS
59.2% $CO_2$
14.8% CO

Under the temperature conditions employed in reactor 18, only about 4 percent of the carbon monoxide fed remains unconverted, while the total selectivity to carbonyl sulfide and carbon disulfide is relatively high. Accordingly, under circumstances of this type, it will generally be found uneconomical to separate the carbon dioxide from the gases in line 54 by alkylol amine absorption or other methods merely for the purpose of recycling the comparatively small amount of unconverted carbon monoxide to reactor 18. As has been previously pointed out, however, at higher temperatures the conversion of carbon monoxide decreases substantially and, as a result, the comparatively high content of carbon monoxide in the gaseous effluent from separator 48 may warrant the recovery thereof and recycling the unconverted carbon monoxide back to the reactor. Thus, assuming that the carbon monoxide content over the effluent gases from separator 48 is at least 50 percent, the gases contained in line 52 are sent to absorber 55 equipped to separate carbon dioxide from the remaining gases present in said mixture. The method used to accomplish this object may be one of any number of well-established procedures. In general, we have found a suitable carbon dioxide separation system involving absorption of carbon dioxide from such gaseous mixtures by the use of a 15 to 25 weight percent aqueous diethanolamine solution, followed by liberation of carbon dioxide from the resulting diethanolamine salt, to constitute an adequate carbon dioxide separation method for the purpose of the present invention. The gas from which the carbon dioxide has been stripped and which consists essentially of carbon monoxide, together with a relatively small amount of carbonyl sulfide, is recycled through line 56 to line 2 where it is mixed with additional carbon monoxide and the feed to reactor 18 prepared as previously described. The solution of diethanolamine, which is saturated with carbon dioxide, leaves absorber 54 through line 58 and is introduced into regenerator 60, in which carbon dioxide is liberated. The resulting lean diethanolamine solution is withdrawn from the regenerator through line 62 and returned to absorber 54, where it is again used to separate carbon dioxide contained in the gaseous mixture supplied by line 62. Make-up amine solution may be added to the system through line 64. The stream, consisting essentially of carbon dioxide liberated in regenerator 60, is withdrawn therefrom through line 66.

Owing to the fact that the chemical properties of carbonyl sulfide and carbon disulfide are substantially the same, it will be apparent that by the process of our invention a very appreciable amount of the starting materials employed are converted in effect into a single, usable, sulfur-containing end product. Thus, for example, carbonyl sulfide reacts similarly to carbon disulfide in the case of alcoholates, mercaptides, amines and the like. The advantage of such a process will be particularly appreciated if it is desired to consume the carbonyl sulfide and carbon disulfide at the plant site for conversion into other sulfur-containing compounds.

From the foregoing description, it will likewise be apparent that the process of our invention is susceptible to numerous modifications without materially departing from the scope thereof. In general, it may be said that any procedure employing in principle the novel conditions set forth herein is intended to come within the spirit of our invention.

We claim:
1. In a process for the production of carbon disulfide from sulfur and carbon monoxide the improvement which comprises reacting a mixture of sulfur and carbon monoxide at temperatures ranging from about 950° to about 1700° F. at a sulfur-oxygen atomic ratio of from about 0.18:1 to about 1:1, the relationship of said ratio to said temperature range being such that any combination of said ratio and temperature employed within the above mentioned ranges defines a point falling substantially on the curve in Figure 2.

2. The process of claim 1 in which a catalyst for the reaction is employed.

3. In a process for the production of carbon disulfide and carbonyl sulfide from sulfur and carbon monoxide the improvement which comprises reacting sulfur with carbon monoxide in a molar ratio ranging from about 0.1 to about 0.5 at temperatures ranging from about 950° to about 1700° F. at a sulfur-oxygen atomic ratio of from about 0.18:1 to about 1:1, the relationship of said molar and atomic ratios to said temperature range being such that any combination of said ratios and temperature employed within the above mentioned ranges defines a point falling substantially on the curve in Figure 2.

4. The process of claim 3 in which a temperature ranging from about 950° to about 1000° F. is employed.

5. The process of claim 3 in which the sulfur-carbon monoxide molar ratio is about 0.5:1, the sulfur-oxygen atomic ratio is about 1:1 and the temperature employed ranges from about 950° to about 1000° F.

References Cited in the file of this patent

UNITED STATES PATENTS

| 2,391,541 | Belchetz | Dec. 25, 1945 |
| 2,663,622 | Odell et al. | Dec. 22, 1953 |

FOREIGN PATENTS

| 398,322 | Germany | July 7, 1924 |

OTHER REFERENCES

Ehret: "Smith's College Chemistry," 6th Ed., 1946, published by D. Appleton-Century Co., Inc., New York, page 37.